United States Patent [19]

Sauter

[11] Patent Number: 5,385,164
[45] Date of Patent: Jan. 31, 1995

[54] COLD WEATHER PERSONAL SHELTER DEVICE

[76] Inventor: Herman J. Sauter, 290 Mill Ave., Myerstown, Pa. 17067

[21] Appl. No.: 222,432

[22] Filed: Apr. 4, 1994

[51] Int. Cl.6 .............................................. E04H 15/00
[52] U.S. Cl. ....................................... 135/87; 135/900; 43/1
[58] Field of Search .................... 43/2, 1; 135/90, 95, 135/106, 109, 115, 116, 900, 901, 902, 87, 96

[56] References Cited

U.S. PATENT DOCUMENTS

| | | |
|---|---|---|
| D. 323,921 | 2/1992 | Kawchak . |
| 1,466,166 | 8/1923 | Hodgson ........................ 135/902 X |
| 3,288,157 | 11/1966 | Szkolny ........................ 135/902 X |
| 3,540,170 | 11/1970 | Flowers .......................... 43/1 X |
| 4,164,089 | 8/1979 | George ............................. 43/1 |
| 4,364,193 | 12/1982 | Visco .......................... 135/901 X |
| 4,587,682 | 5/1986 | Schultz . |
| 4,682,436 | 7/1987 | Ritson ............................ 135/98 X |
| 4,825,578 | 5/1989 | Robinson ....................... 135/901 X |
| 4,866,124 | 9/1989 | Biglione et al. . |
| 4,884,303 | 12/1989 | Scherer . |
| 5,197,216 | 3/1993 | Norris ............................. 135/90 X |

FOREIGN PATENT DOCUMENTS 0676141 7/1952 United Kingdom ................. 135/96

*Primary Examiner*—Lanna Mai
*Attorney, Agent, or Firm*—Hugh E. Smith

[57] ABSTRACT

A unit intended to protect an individual against cold when standing or sitting for a protracted time which comprises a loose, insulated body covering having a vertical zippered closure; shoulder straps attached to the upper portion of said body covering to support it on a user; and a rigid insulated base portion attached to said body covering to provide foot insulation for the user wearing the unit while standing or sitting. A supplemental hood-cape extension is provided for further protection if the need exists.

4 Claims, 3 Drawing Sheets

COLD WEATHER PERSONAL SHELTER DEVICE

BACKGROUND OF THE INVENTION

1. Field of the Invention

The present invention relates to a protection device for cold weather use and more particularly pertains to such a device which may be used by hunters, fishermen, or sports fans who will be standing or sitting for periods of time in a cold weather setting.

2. Description of the Prior Art

The use of body protection for cold weather is known in the prior art. More specifically, such devices heretofore devised and utilized for the purpose of keeping an individual warm are known to consist basically of familiar, expected and obvious structural configurations, notwithstanding the myriad of designs encompassed by the crowded prior art which have been developed for the fulfillment of countless objectives and requirements. Most are designed for an individual's use when in the horizontal position, e.g. sleeping bags. Typical of such devices are shown in U.S. Pat. Nos. 4,884,303; 4,866,124; 4,587,682; and 323,921. Such constructions are not suitable for prolonged standing or sitting since the foot portion of such sleeping baas will wear out very rapidly and since the insulation under the feet will be compressed, eliminating the insulating air from the fill within such bags.

In this respect, the unit according to the present invention substantially departs from the conventional concepts and designs of the prior art, and in so doing provides an apparatus primarily developed for the purpose of cold weather personal protection while standing or sitting with one's feet on the ground.

Therefore, it can be appreciated that there exists a continuing need for new and improved cold weather protection while a person is standing or sitting. In this regard, the present invention substantially fulfills this need.

SUMMARY OF THE INVENTION

In view of the foregoing disadvantages inherent in the known types of cold weather protection devices now present in the prior art, the present invention provides an improved protection device construction wherein the same can be utilized by hunters, etc. for standing or sitting in a cold weather setting. As such, she general purpose of the present invention, which will be described subsequently in greater detail, is to provide a new and improved cold weather personal shelter device which has all the advantages of the prior art devices and none of the disadvantages.

To attain this, the present invention essentially relates to a unit intended to protect an individual against cold when standing or sitting for a protracted time which comprises a loose, insulated body covering having a vertical zippered closure; shoulder straps attached to the upper portion of said body covering to support it on a user; and a rigid insulated base portion attached to said body covering to provide foot insulation for the user wearing the unit while standing or sitting. A supplemental hood-cape extension is provided for further protection if the need exists.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved cold weather personal shelter which has all the advantages of the prior art devices and none of the disadvantages.

It is another object of the present invention to provide a new and improved cold weather personal shelter which may be easily and efficiently manufactured and marketed.

It is a further object of the present invention to provide a new and improved cold weather personal shelter which is of a durable and reliable construction.

An even further object of the present invention is to provide a new and improved cold weather personal shelter which is susceptible of a low cost of manufacture with regard to both materials and labor, and which accordingly is then susceptible of low prices of sale to the consuming public, thereby making such devices economically available to the buying public.

Still yet another object of the present invention is to provide a new and improved cold weather personal shelter device which provides in the construction of the prior art some of the advantages thereof, while simultaneously overcoming some of the disadvantages normally associated therewith.

Still another object of the present invention is to provide a new and improved protective device for standing or sitting in a cold weather environment.

Yet another object of the present invention is to provide a new and improved readily transportable cold weather personal shelter.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
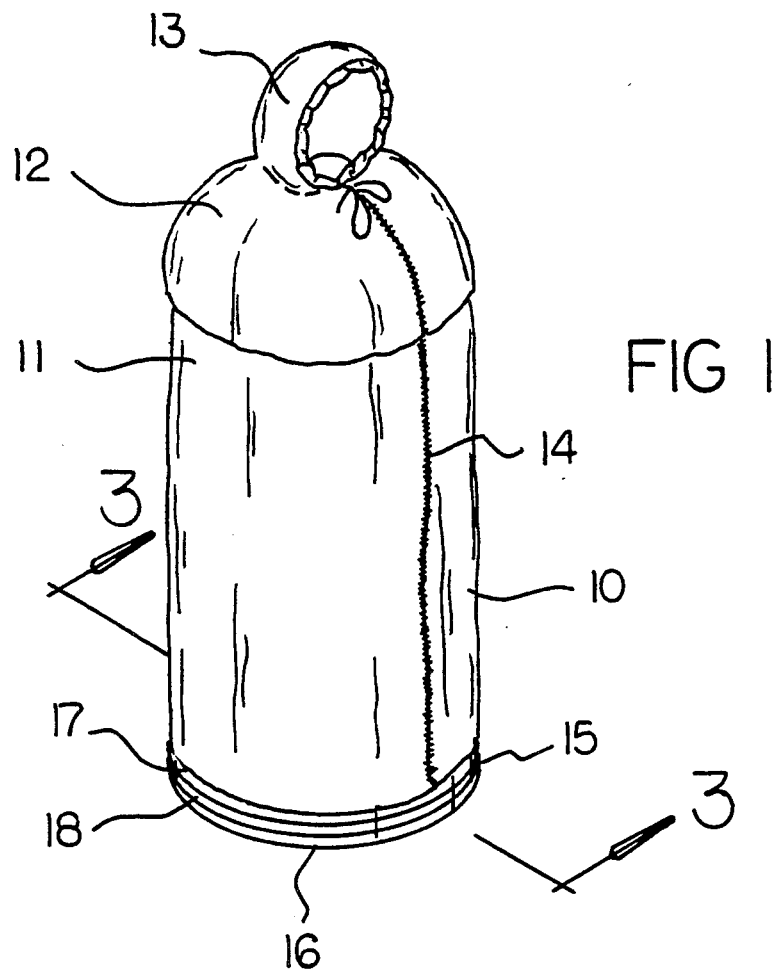
FIG. 1 is a perspective view of the present invention.

With reference now to the drawings, and in particular to FIG. 1 thereof, a new and improved cold weather personal shelter device embodying the principles and concepts of the present invention and generally designated by the reference numeral 10 will be described.

More specifically, it will be noted that the personal shelter 10 of the present invention comprises a sack-like, loose body covering 11 formed of a flexible insulated fabric having a waterproof coating thereon. The upper portion of such body covering 11 has a cape member 12 covering the shoulder area of the wearer and an attached drawstring hood 13. A full length zipper 14 permits access to the interior of body covering 11. At the lower portion of body covering 11, a rigid base platform member 15 is affixed to such body portion 11. Base member 15 is composed of a ground-contacting wooden disc 16 of the same circumference as that of body covering 11, e.g. one-quarter inch plywood, a second similar wooden disc 17 and a coextensive insulating disc 18 inserted between the two wooden discs 16 and 17. Disc 18 may be made of any suitable insulation, e.g. closed-off foam. Although the wood discs 16 and 17 in and of themselves, provide substantial insulation. The layer 18 insures against penetration of cold from the ground to a user's feet.

Figure 2:
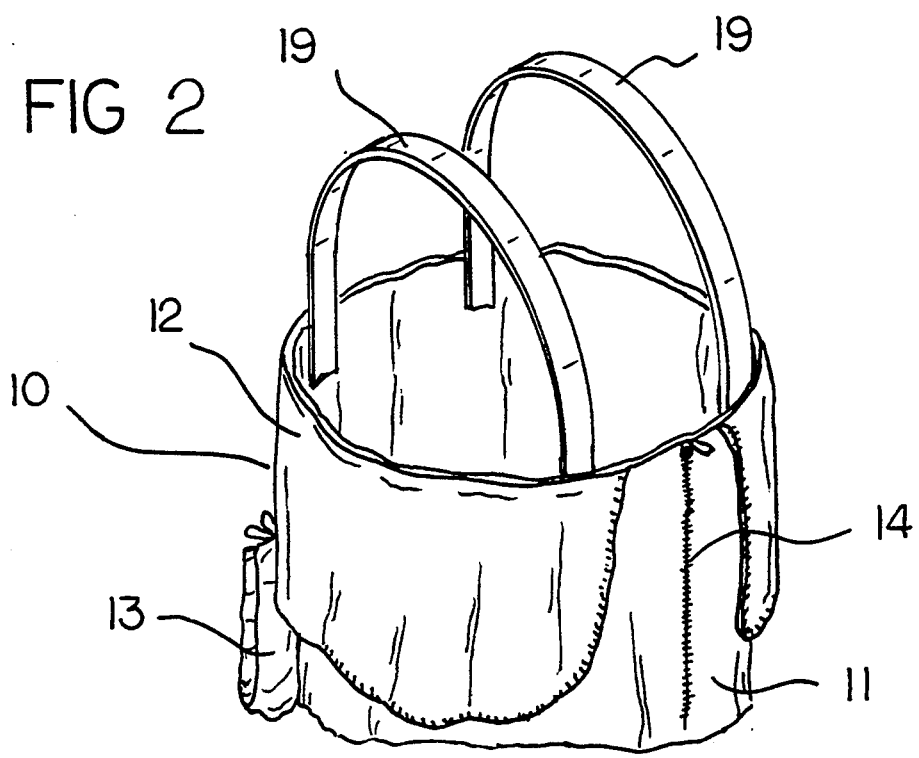
FIG. 2 is a perspective view of the upper portion of the device of the present invention.

FIG. 2 illustrates the use of shoulder straps 19 affixed to body covering 11. Straps 19 go over the shoulders of the user and support the weight of body covering 11. Unlike a sleeping bag, the unit 10 is designed for use in a standing or sitting configuration and straps 19 are necessary to keep body covering 11 from falling down or from the uncomfortable alternative of relying upon the hood 13 to support the unit 10 from the user's head.

Figure 3:
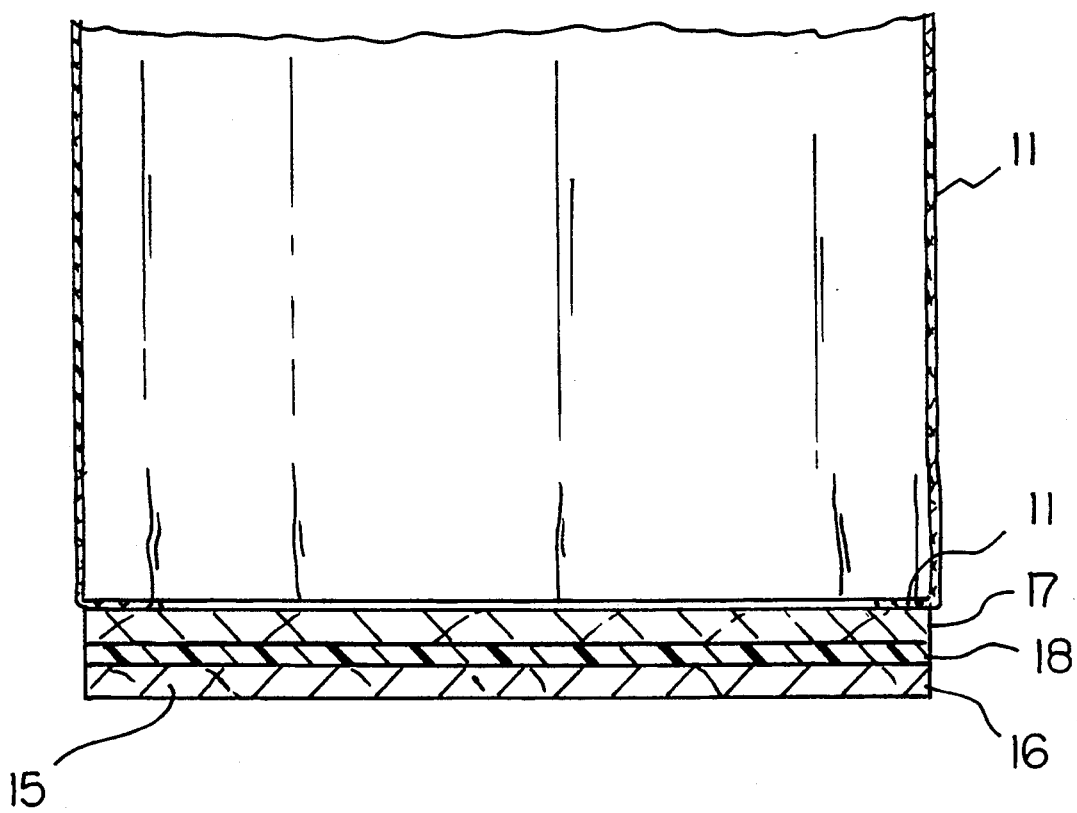
FIG. 3 is a sectional view on line 3—3 of FIG. 1.

FIG. 3 is a sectional view of the lower portion of unit 10 showing the body covering 11 affixed to base portion 15. This view shows the three layers of base portion 15, i.e. wood discs 16 and 17 and intermediate insulation disc 18. Body covering 11 is affixed to the upper wood disc 17 by adhesive, staples or the like. Wood disc 16 provides a standing or sitting foot platform and since body covering 11 is not directly affixed to disc 16, wear and tear on the material thereof by ground contact is avoided. Base portion 15 has the segments 16, 17 and 18 thereof fastened one to the other by adhesive, nails or the like.

Figure 4:
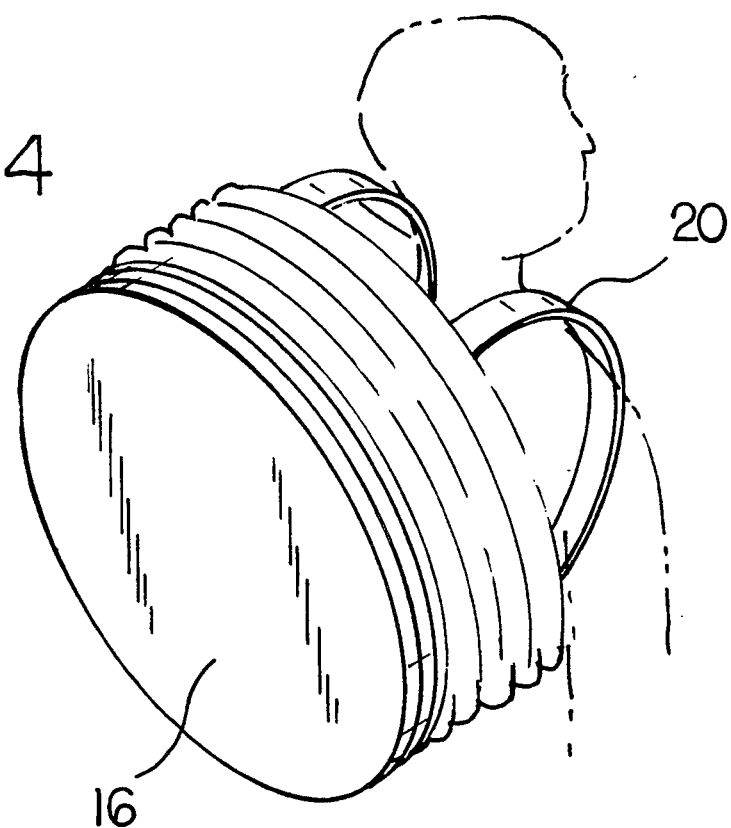
FIG. 4 is a perspective view of the present invention in the carry position.
Figure 5:
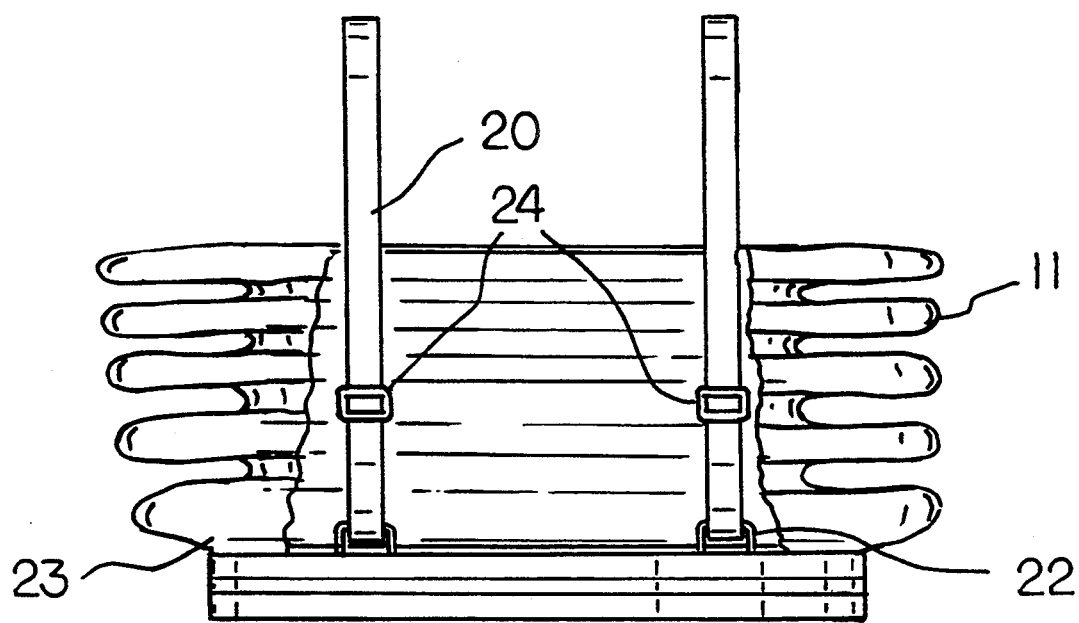
FIG. 5 is a plan view on line 6—6 of FIG. 5.

FIGS. 4 and 5 show the manner in which the shelter unit 10 may be transported. Accessory shoulder straps 20 are provided and adjustably secured at the ends 21 thereof to staple-like strap eyes 22 mounted on the interior or upper surface 23 of wood disc 17. A pair of ladder type buckles 24 allow take-up adjustment of straps 20. Body covering 11 when removed from the user is allowed to collapse onto the base portion 15 and, when straps 20 are tightened, such body covering 11 is caused to be compressed into a neat, compact bundle as shown.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A cold weather personal shelter device which will allow a user to stand or sit with feet on the ground in comfort which comprises: a loose, flexible, insulated body covering including an attached shoulder cape and open-faced head hood; a zippered opening providing access to the interior of said body covering; and a rigid insulating platform affixed to the lower end of said body covering.

2. A device as in claim 1 wherein said body covering is provided with a pair of shoulder straps to support said body covering from the shoulders of the user.

3. A device as in claim 1 wherein said insulating platform comprises a pair of circular wooden discs of the same circumference as that of said body covering and a coextensive disc of insulating material inserted between said wooden discs, all of said discs being secured one to another.

4. A device as in claim 1 wherein a second set of adjustable shoulder straps are affixed in removable fashion to the interior surface of said insulating platform to compress said body covering between the insulating platform and the back of a person wearing said second set of shoulder straps.

* * * * *